W. WENDERHOLD.
INTERMITTENT CLAW MOVEMENT.
APPLICATION FILED FEB. 12, 1917.

1,246,198.

Patented Nov. 13, 1917.
3 SHEETS—SHEET 1.

WITNESSES:

INVENTOR
William Wenderhold
BY
ATTORNEY

W. WENDERHOLD.
INTERMITTENT CLAW MOVEMENT.
APPLICATION FILED FEB. 12, 1917.

1,246,198.

Patented Nov. 13, 1917.
3 SHEETS—SHEET 2.

WITNESSES:

INVENTOR
William Wenderhold
BY

ATTORNEY

W. WENDERHOLD.
INTERMITTENT CLAW MOVEMENT.
APPLICATION FILED FEB. 12, 1917.

1,246,198.

Patented Nov. 13, 1917.
3 SHEETS—SHEET 3.

WITNESSES:

INVENTOR
William Wenderhold
BY

ATTORNEY

UNITED STATES PATENT OFFICE.

WILLIAM WENDERHOLD, OF NEW YORK, N. Y., ASSIGNOR TO POLYCHROMATIC FILM CORPORATION, A CORPORATION OF NEW YORK.

INTERMITTENT CLAW-MOVEMENT.

1,246,198.  Specification of Letters Patent.  Patented Nov. 13, 1917.

Application filed February 12, 1917. Serial No. 148,081.

*To all whom it may concern:*

Be it known that I, WILLIAM WENDERHOLD, a citizen of the United States, residing at New York city, in the county and State of New York, have invented certain new and useful Improvements in Intermittent Claw-Movements, of which the following is a clear, full, and exact description.

This invention relates to motion picture apparatus and more specifically to a device for advancing a film intermittently.

The objects of my improvement are, first, to provide a device that can be operated at a very high speed, secondly, without noise, and thirdly, without vibration, which are of great importance in the making of successive pictures.

I attain these objects by the mechanism illustrated in the accompanying drawing in which—

Figure 1:
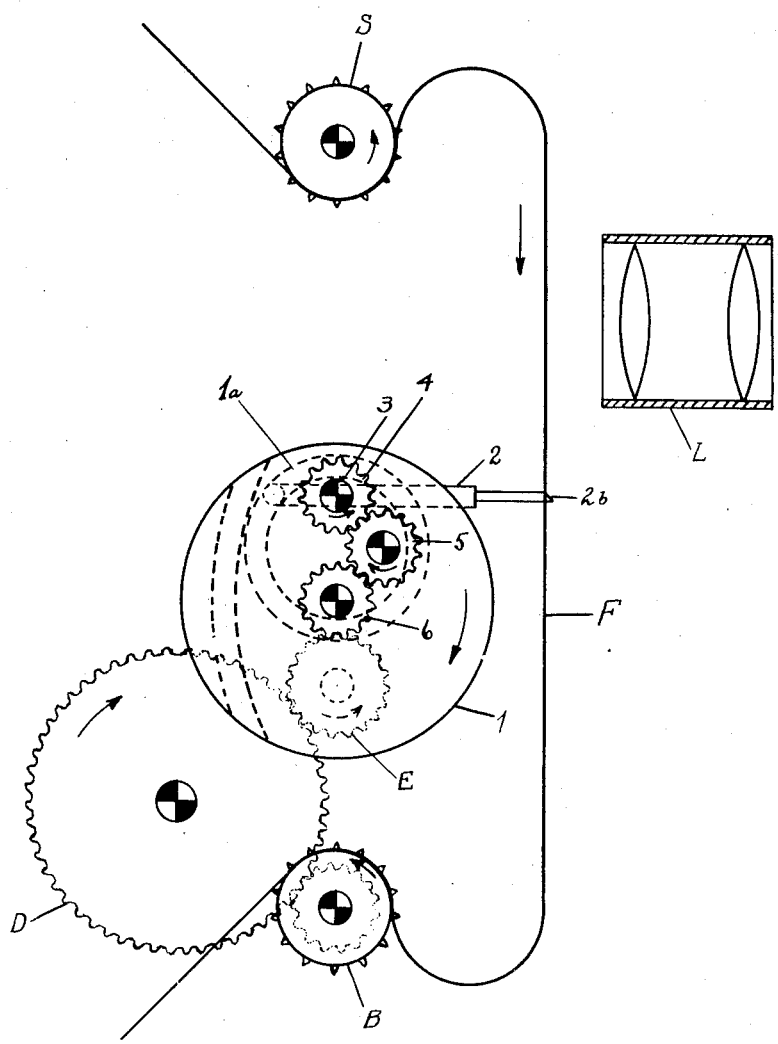
Figure 1 is a side elevation showing the device as mounted in a picture camera.
Figure 2:
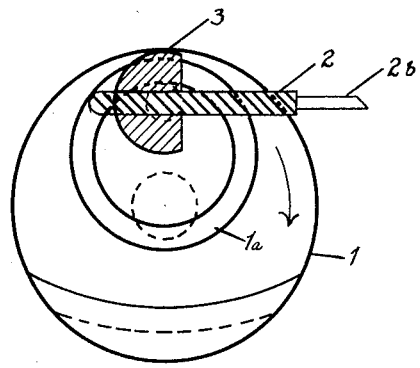
Fig. 2, Fig. 3 and Fig. 4 are cross-sections through the specific device showing the various positions.
Figure 3:
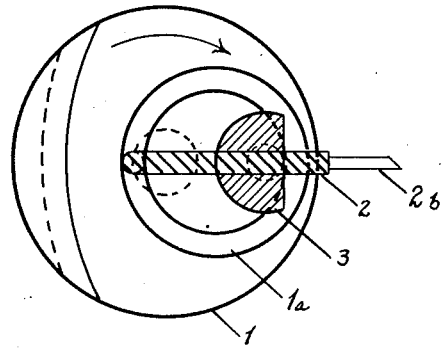
Figure 4:
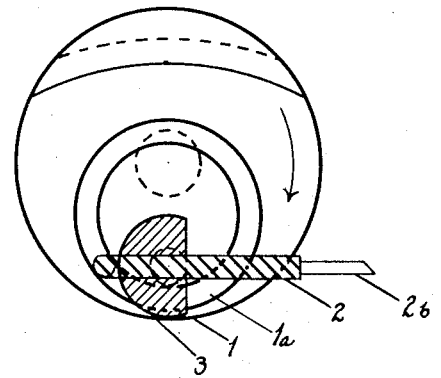
Figure 5:
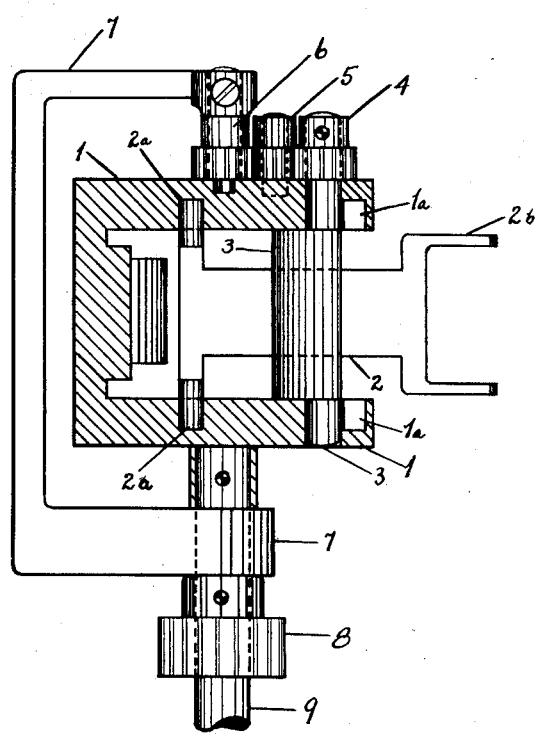
Fig. 5 is a top view of the device.

Referring to Fig. 1, F is a film passing in front of the lens. S and B are the usually employed continuously driven feed sprockets. My device consists of a continuously rotating casing 1 having cam grooves 1ª. These cam grooves are engaged by the round studs 2ª on the sliding prong bracket 2. This bracket is mounted in the revoluble support 3. A gear 4 is mounted upon the spindular end of member 3 and securely fastened thereto. The gear 4 engages gear 5. The gear 6 is mounted in alinement with the center of the rotating casing 1 in the supporting structure 7 and fastened therein (non-rotating) the rotating casing 1 carrying the gears 4 and 5 around the stationary gear 6, thereby holding the prong bracket 2 continually in rectangular alinement with the film F. The points 2ᵇ enter and leave the perforations of the film once during every revolution of the casing 1.

The cam grooves 1ª determine the depth to which the prongs 2ᵇ enter the perforations in the film F. The entire device can be revolved at a very high speed and with great precision.

D is the main driving gear. E is an intermediary gear, and 8 is the driven gear fastened on shaft 9 on which is also fastened the casing 1. The part 3 is slotted in the center to carry member 2 and allow it to slide back and forth therein, as determined by the cam grooves 1ª.

What I claim as my invention is:

1. A continuously rotating casing, cam grooves therein, a revoluble support carried therein, said support carrying a member engaged by a cam groove at one extremity and adapted to engage a perforated band at another extremity at intervals during rotation.

2. A film advancing mechanism consisting of a rotary casing, cam grooves therein, a revoluble support carried by said casing, a sliding member carried by said support and engaged by the grooves, a gear on said revoluble support, another gear carried by the revolving casing engaging the first mentioned gear, supporting structure for the entire device, and a stationary gear mounted therein engaging the revolving gear of the casing.

Signed at New York city, New York, this 10th day of February, one thousand nine hundred and seventeen.

WILLIAM WENDERHOLD

Witnesses:
ROBERT C. RICHTER,
MARIAN FOSTER.